No. 732,583. PATENTED JUNE 30, 1903.
K. V. PAINTER.
BALL.
APPLICATION FILED MAR. 19, 1903.
NO MODEL

WITNESSES
INVENTOR
K. V. Painter
By H. A. Seymour
Attorney

No. 732,583. Patented June 30, 1903.

UNITED STATES PATENT OFFICE.

KENYON V. PAINTER, OF CLEVELAND, OHIO.

BALL.

SPECIFICATION forming part of Letters Patent No. 732,583, dated June 30, 1903.

Application filed March 19, 1903. Serial No. 148,589. (No model.)

*To all whom it may concern:*

Be it known that I, KENYON V. PAINTER, a resident of Cleveland, in the county of Cuyahoga and State of Ohio, have invented certain new and useful Improvements in Balls; and I do hereby declare the following to be a full, clear, and exact description of the invention, such as will enable others skilled in the art to which it appertains to make and use the same.

My invention relates to an improvement in balls, and more particularly to golf-balls and the like, the object of the invention being to provide improvements of this character which will result in a ball of maximum elasticity and driving power, yet of the proper size and weight for the purposes intended.

A further object is to utilize crude rough rubber, known in the trade as "pure Pará gum," pure or approximately pure, in the construction of the ball, which in combination with the other elements produce a ball superior to anything heretofore known.

With these objects in view the invention consists in certain novel features of construction and combinations and arrangements of parts, as will be more fully hereinafter described, and pointed out in the claims.

Figure 1:
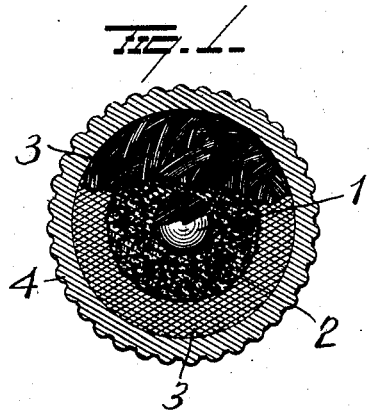
Figure 2:
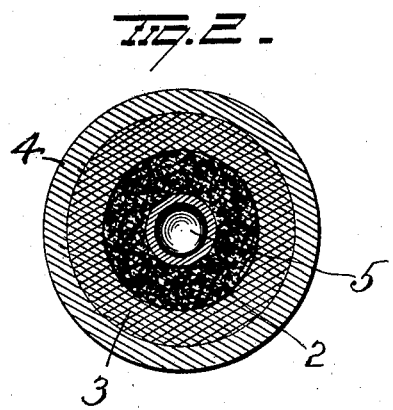
Figure 3:
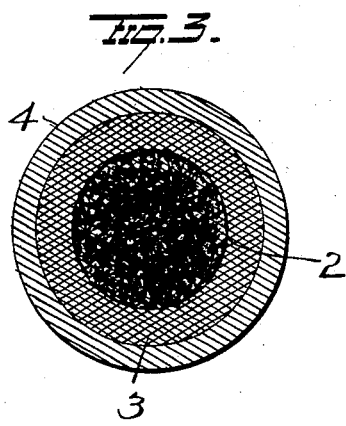

In the accompanying drawings, Figure 1 is a view in section illustrating my improvements, and Figs. 2 and 3 are similar views of modifications.

1 represents an inner solid core, which is preferably of gutta-percha, although it may be of metal, hard rubber, clay, or any other material. The core 1 is surrounded and inclosed in a covering 2, of porous gum or rubber, pure or approximately pure. This porous gum or rubber is produced in sheets or blocks of irregular or uneven surface and more or less porous, so that when assembled around the core will form numerous air-cells, and while it is possible to produce gum or rubber without being porous I do not believe it possible to assemble such gum or rubber in a golf-ball without forming air-cells and resulting in porous gum or rubber, and it is therefore to be understood that when the term "porous rubber" is hereinafter employed it is intended to be construed broadly enough to cover crude rough rubber or pure Pará gum, pure or approximately pure, or any form of rubber containing air-cells or air-compartments. Around the crude or rough rubber or gum covering 2 a strip or strips of rubber 3 are wound under high tension, compressing the covering 2 into comparatively small compass and maintaining it elastically bound into this size. Over the elastic binder 2 an outer covering or shell 4 is located, and this shell is preferably of gutta-percha, although other material may be used, if preferred.

By employing crude or rough rubber or gum I provide a substance or material which is cheap to manufacture and capable of great elasticity and when elastically bound and held compressed by the bands 3 imparts to the ball the maximum elasticity and driving power and results in a ball which is a vast improvement over anything heretofore known.

In the modified construction shown in Fig. 2 I illustrate a hollow core 5 instead of a solid core, as shown in Fig. 1. This hollow core may be of any suitable material, elastic or inelastic—such as rubber, celluloid, gutta-percha, paper, metal, or any other material. In other respects the ball is of the same constructions as set forth in the description of the preferred form of my invention.

In Fig. 3 I have shown the ball constructed without any central core other than the crude or rough rubber or gum 2.

It may be possible to utilize crude or rough rubber or gum, pure or approximately pure, in the construction of golf-balls otherwise disposed with relation to the other elements of the ball than hereinbefore described, and as I claim, broadly, the use of this material in the construction of balls I do not wish to confine myself to the details of construction set forth, but consider myself at liberty to make such slight changes and alterations as fairly fall within the spirit and scope of my invention.

Having fully described my invention, what I claim as new, and desire to secure by Letters Patent, is—

1. A ball composed in part of pure or approximately pure gum assembled so that air-cells are formed substantially such as herein set forth.

2. A ball composed in part of pure or approximately pure gum, assembled so that air-cells are formed substantially such as herein set forth and an elastic binding holding the same under compression.

3. A ball composed in part of pure or approximately pure gum, assembled so that air-cells are formed substantially such as herein set forth, an elastic binding holding the same under compression and an outer shell or covering inclosing the binder.

4. A ball comprising an inner core, crude or rough rubber or gum around the same and an inclosing elastic binder wound around the crude or rough rubber or gum holding the same under compression.

5. A ball comprising an inner core, crude or rough rubber or gum around the same, an elastic tape wound under high tension around the crude or rough rubber or gum, and an outer shell inclosing the tape.

6. A ball comprising a solid gutta-percha core, porous rubber or gum inclosing the same, elastic tape wound under high tension around the porous rubber and holding it under compression, and an outer shell or covering of gutta-percha.

7. A ball, comprising an inner gutta-percha core, crude or rough rubber or gum inclosing the core, an elastic tape wound under high tension around the crude or rough rubber or gum, and an outer shell or casing of gutta-percha.

8. A ball comprising a sphere of crude or rough rubber or gum substantially such as described, interposed between an inner core and an outer casing.

9. A ball comprising a sphere composed of crude or rough rubber or gum substantially such as herein described, retained under compression and interposed between an inner core and an outer covering.

In testimony whereof I have signed this specification in the presence of two subscribing witnesses.

KENYON V. PAINTER.

Witnesses:
S. W. FOSTER,
A. W. BRIGHT.